United States Patent
Shymko

(10) Patent No.: US 6,236,001 B1
(45) Date of Patent: May 22, 2001

(54) SCOOP WITH WEIGH SCALE

(76) Inventor: Wayne W. Shymko, 34 Dvoras Cove, Winnipeg, Manitoba (CA), R2V 4M6

( * ) Notice: Subject to any disclaimer, the term of this patent is extended or adjusted under 35 U.S.C. 154(b) by 0 days.

(21) Appl. No.: 09/365,743

(22) Filed: Aug. 3, 1999

(51) Int. Cl.[7] .......................... G01G 19/56; G01G 19/22; G01G 3/14; G01C 9/06
(52) U.S. Cl. .................. 177/149; 177/25.13; 177/211; 33/366.11
(58) Field of Search .................... 177/126, 127, 177/131, 148, 149, 211, 229, 25.11, 25.12, 25.13, 45; 33/366.11, 366.12, 366.25, 366.26

(56) References Cited

U.S. PATENT DOCUMENTS

| | | | |
|---|---|---|---|
| 412,049 | * | 10/1889 | Side ........................................ 177/148 |
| 537,743 | * | 4/1895 | Bergquist ............................... 177/148 |
| 570,434 | * | 10/1896 | Johnson .................................. 177/148 |
| 578,642 | * | 3/1897 | Joslyn ..................................... 177/148 |
| 734,653 | * | 7/1903 | Alexander ............................... 177/148 |
| 748,856 | * | 1/1904 | Fox ........................................ 177/148 |
| 781,920 | * | 2/1905 | Taylor ..................................... 177/148 |
| 784,641 | * | 3/1905 | Taylor ..................................... 177/148 |
| 807,334 | * | 12/1905 | Swank .................................... 177/148 |
| 852,183 | * | 4/1907 | Howe ..................................... 177/148 |
| 1,266,881 | * | 5/1918 | Taylor ..................................... 177/148 |
| 2,333,385 | * | 11/1943 | Le Bert .................................. 177/148 |
| 2,893,134 | * | 7/1959 | Shea et al. ........................... 33/366.11 |
| 3,701,093 | * | 10/1972 | Pick ..................................... 33/366.11 |
| 4,347,905 | * | 9/1982 | Berckes .................................. 177/149 |
| 4,373,155 | * | 2/1983 | Dola ..................................... 200/84 R |
| 4,421,186 | * | 12/1983 | Bradley .................................. 177/139 |
| 4,660,666 | * | 4/1987 | Reder et al. ........................... 177/148 |
| 4,697,655 | * | 10/1987 | Junkas .................................... 177/127 |
| 4,832,092 | * | 5/1989 | Hirose et al. .......................... 177/229 |
| 4,909,340 | * | 3/1990 | Kazais et al. ........................... 177/211 |
| 5,042,158 | * | 8/1991 | Schmelzer .......................... 33/366.11 |
| 5,121,328 | * | 6/1992 | Sakai et al. ......................... 177/25.15 |
| 5,199,518 | * | 4/1993 | Woodle .................................. 177/211 |
| 5,442,146 | * | 8/1995 | Bell et al. ......................... 177/210 FP |
| 5,545,855 | * | 8/1996 | Stanfeld et al. .................... 177/25.13 |
| 5,646,376 | * | 7/1997 | Kroll et al. ............................ 177/211 |
| 5,669,147 | * | 9/1997 | Nakajima et al. ................. 33/366.11 |
| 5,714,695 | * | 2/1998 | Bruns .................................... 177/211 |
| 5,773,767 | * | 6/1998 | Collins, Jr. et al. .................. 177/126 |
| 5,854,447 | * | 12/1998 | Greenwood et al. ............. 177/25.14 |
| 5,955,713 | * | 9/1999 | Titus et al. ......................... 33/366.11 |

OTHER PUBLICATIONS

Modern Plastics '99, pp. B–73, B–74, B–75, B–79, B–105, B–106, B–107, Nov. 1998.

Chatillon, SPEC Sheet 3825/Jan. 1997 1 Sheet Both Sides John Chatillon & Sons, Inc.

Food Equipment Materials, p. 1, ANSI/NSFSI–1997 NSF International.

Letter, Mr. Parkman, Rice Lake Weighing Systems Sep., 2000.

* cited by examiner

*Primary Examiner*—Randy W. Gibson
(74) *Attorney, Agent, or Firm*—Robert W. B. Bailey

(57) ABSTRACT

A scoop has a handle attached thereto by a neck. The neck has a built in strain gauge supporting the scoop which measures weight in the scoop. An analog-digital converter converts the strain gauge output to a digital signal, which displays the weight as a readout (either metric or avoirdupois) on a panel in the handle. Control switches built into the handle or panel control the functions of the scoop, while indicator/annunciator lights indicate status. A level indicator is provided having a ball bearing resting freely on a conducting bottom plate forming a spherical sector of predetermined angle and a cylindrical sidewall having therein conducting elements. When the ball bearing contacts a sidewall conducting element it closes a circuit which switches off a level indicator/annunciator light, which when on shows that the scoop is level. The position of the ball bearing is visible to the operator, allowing correction of tilt. The predetermined angle is set between 8 and 12°, so that tilts greater than 4 or 6° are visually indicated.

20 Claims, 2 Drawing Sheets

SCOOP WITH WEIGH SCALE

This invention relates to scoops with weighing capacity. Scoops generally have attached handles. In this case, a weighing device such as a load cell incorporating a strain gauge connects the handle to the scoop supporting the scoop proper, and a display scale is built into the handle. The weighing device is calibrated so that when the scoop is empty it registers zero, and registers the specific weight of material in the scoop.

Although the invention is described and referred to specifically as it relates to specific devices, structures and methods for scoops with handles incorporating display scales, it will be understood that the principles of this invention are equally applicable to similar devices, structures and methods for material containing and handling and accordingly, it will be understood that the invention is not limited to such devices, structures and methods for material containing and handling.

BACKGROUND OF INVENTION

Generally scoops are used to transfer bulk material from a storage or holding container to a traditional weighing scale, where the bulk material is poured out to be weighed. Often a specific approximate or exact amount is required, and achieved by hit and miss methods. It is of practical advantage and convenience to know the amount in the scoop before pouring.

PRIOR ART

Scoops and the like are ancient. Applicant is not aware of prior art scoops incorporating means to indicate content weight.

It is a principal object of the invention to provide a scoop having weighing capacity. It is a further principal object of the invention to provide a scoop having weighing capacity and a display scale. It is a further principal object to provide a level indicator for the scoop. Other objects will be apparent to those skilled in the art from the following specification, appended claims and accompanying drawings.

DESCRIPTION OF THE INVENTION

In one broad aspect the invention is directed to a scoop attached to a handle. The handle comprises load cell means with strain gauge means. The load cell means is mounted in the handle and bears the scoop. Preferably the handle has a projecting neck extending toward the scoop covering the load cell. The strain gauge is operatively associated with CPU means, which is operatively associated with readout display means, whereby a weight in the scoop is converted to a display number on the readout display means. Preferably the scoop is manufactured from PVC (polyvinylchloride), especially preferred is flex PVC. PVC is approved by both the USDA (United States Department of Agriculture) and the FDA (Food and Drug Administration, of the United States) for use with food and agricultural products. The scoop is not restricted to these materials, conventional light metals including alloys, a wide range of conventional plastics, ceramics, and wood may be used. Typically there is a control switch assembly operatively associated with the CPU means, and similarly there are indicator/annunciator lights operatively associated with the CPU means. The control switch assembly has a plurality of switches, typically one switch each for ON/ZERO, OFF, ACCUMULATE, HOLD and UNITS. The ON/ZERO switch actuates the CPU means on first actuation, and setting the display number to zero on second and subsequent actuations. The OFF switch deactivates the CPU means. The ACCUMULATE switch actuates the readout display when a second or subsequent weight is placed in the scoop displaying the summed weights as a display number on the readout display. The HOLD switch HOLD switch actuates the readout display to display the previous display number. The UNITS switch changes the units of weight of the display number, from metric to avoirdupois, or from avoirdupois to metric. Typically the indicator/annunciator lights comprise ZERO, HOLD, and UNITS lights. The ZERO light is lit when the display number on the readout display is zero, but not otherwise. The HOLD light is lit when the readout display shows the previous display number, but not otherwise. One UNIT light is lit when the display number indicates metric units, but not otherwise. The other UNIT light is lit when the display number indicates avoirdupois units, but not otherwise. A level indictor is preferably operatively associated with the CPU means. The level indicator actuates a level registering means, which registers level when the means is horizontal or at an angle to the horizontal less than or equal to a predetermined angle, and does not register level when the means is at an angle to the horizontal greater than the predetermined angle. An indicator/annunciator light is operatively associated with the level registering means. The light is lit when the level registering means registers level, and off otherwise.

In a second broad aspect the invention is directed to a level indicator comprising a conducting base being part of a electric circuit, and forming a sector of a generally spherical surface. The base has a conducting surface, which is typically metal, conveniently the entire base is a metal plate or sheet. A sidewall circumvent the sector extends inward toward the center of the spherical surface. The sidewall has a circumferential conducting element spaced apart from and above the conducting base. This conducting element is part of the electric circuit and generally level when the indicator is level. A round conductor typically a ball bearing rests and is rollable on the conducting base. The ball bearing is in the middle of the conducting base when the base is level, and touches the conducting element in the sidewall when resting against the sidewall, whereby the electric circuit is closed. The electric circuit when open allows an indicator/annunciator light to light and when closed switches it off. The spherical surface preferably subtends an angle of between about 8 and 12° at the center of the spherical surface, allowing the indicator to tilt up to half the angle before the ball contacts the sidewall. The level indicator may have a transparent insulating top wall above and touching the sidewall spaced apart from and opposed to the conducting base. Preferably a scoop having an attached handle, incorporates the level indicator which is associated with the handle. Preferably the scoop has load cell means with strain gauge means, said load cell means being mounted in said handle and bearing said scoop. The level indicator may be mounted directly on the load cell, or more preferably on a neck attached or integral with the handle. When present the neck projects toward the scoop covering the load cell. The strain gauge is operatively associated with CPU means, which is operatively associated with readout display means, whereby a weight in the scoop is converted to a display number on the readout display means. Typically there is a control switch assembly operatively associated with the CPU means, and similarly there are indicator/annunciator lights operatively associated with the CPU means. The control switch assembly has a plurality of switches, typically one switch each for ON/ZERO, OFF, ACCUMULATE, HOLD and UNITS. The ON/ZERO switch actuates the CPU means on first actuation, and setting the display number to zero on second and subsequent actuations. The OFF switch deactivates the CPU means. The ACCUMULATE switch actuates the readout display when a second or subsequent weight is placed in the scoop displaying the summed weights as a display number on the readout display. The HOLD switch actuates the readout display to display the previous display number. When HOLD and ACCUMULATE switches are combined the first actuation actuates the readout display to display the previous display number, while the second actuation displays summed weights when a second or subsequent weight is placed in the scoop. The UNITS switch changes the units of weight of the display number, from metric to avoirdupois, or from avoirdupois to metric. Typically the indicator/annunciator lights comprise ZERO, HOLD, and UNITS lights. The ZERO light is lit when the display number on the readout display is zero, but not otherwise. The HOLD light is lit when the readout display shows the previous display number, but not otherwise. One UNIT light is lit when the display number indicates metric units, but not otherwise. The other UNIT light is lit when the display number indicates avoirdupois units, but not otherwise. A level indictor is preferably operatively associated with the CPU means. The level indicator actuates a level registering means, which registers level when the means is horizontal or at an angle to the horizontal less than or equal to a predetermined angle, and does not register level when the means is at an angle to the horizontal greater than the predetermined angle. An indicator/annunciator light is operatively associated with the level registering means. The light is lit when the level registering means registers level, and off otherwise.

The invention in a third broad aspect is directed to a method of weighing material, by placing it in a hand held scoop, where the material displaces a strain gauge in a load cell in the scoop, the displacement of the strain gauge is measured, and this displacement is converted into a weight, which is displayed on a visual display. Preferably the strain gauge displacement is measured as analog, converted to a digital using an analog digital converter, and displaying the digital weight on the visual weight display. The method also indicates when the scoop is not level by closing a circuit when the scoop level is further than a predetermined angle from horizontal, the closed circuit switches off an annunciator/indicator light showing the scoop is level within the predetermined angle from horizontal. Preferably the closed circuit also disables the visual weight display.

DESCRIPTION OF THE PREFERRED EMBODIMENTS

Figure 1:
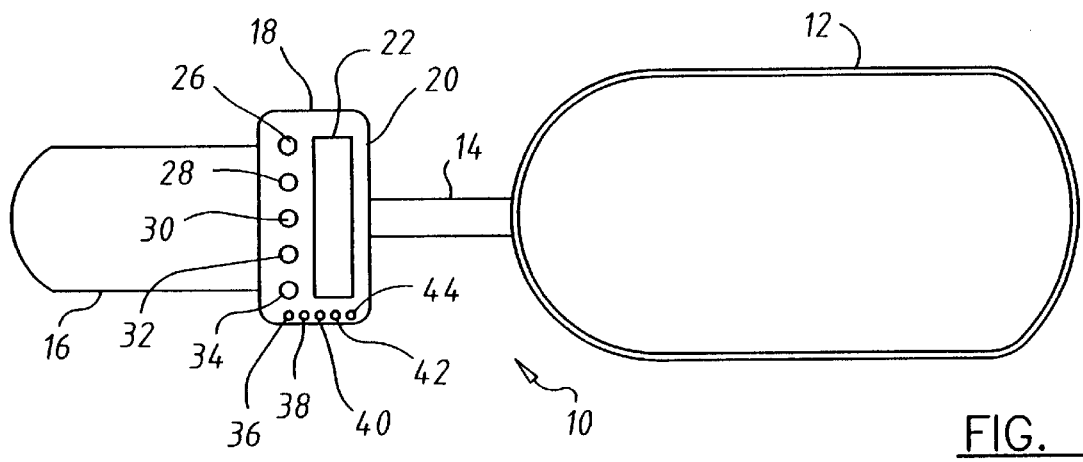
FIG. 1 shows a top plan view of an embodiment of the invention.
Figure 2:
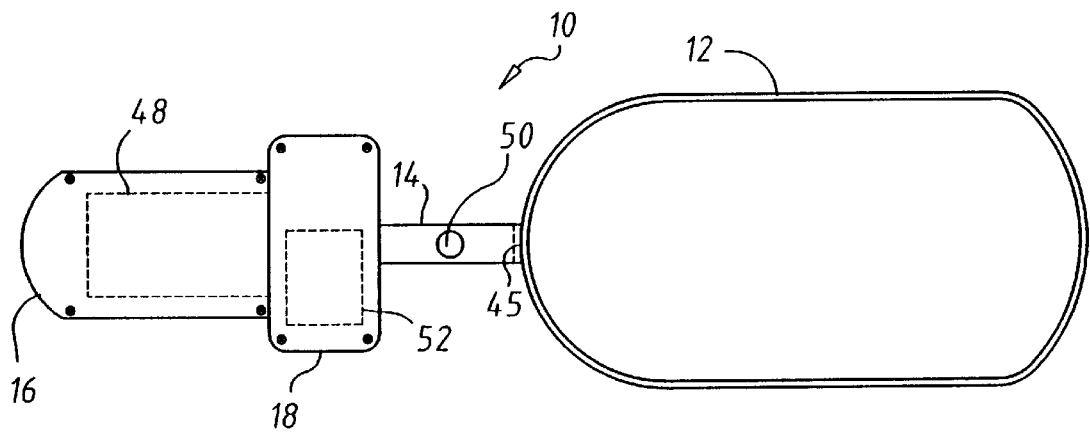
FIG. 2 shows a bottom plan view of the embodiment of FIG. 1.
Figure 3:
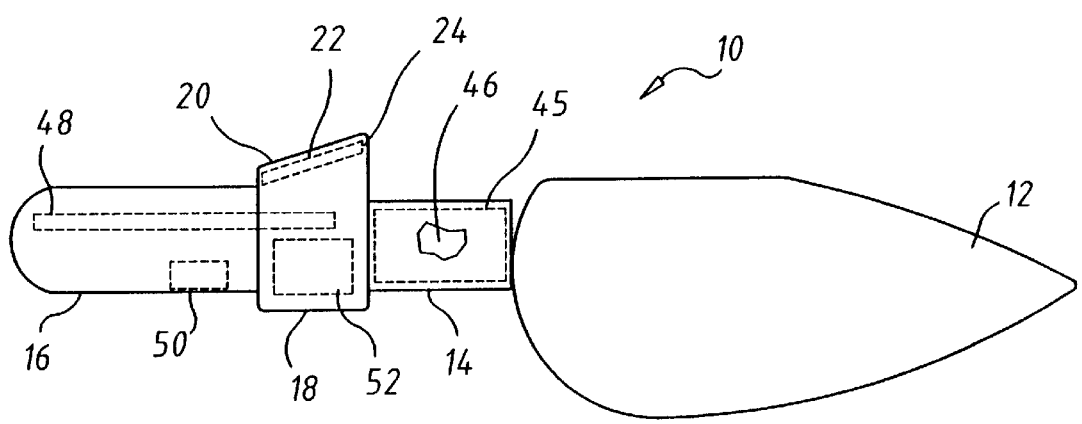
FIG. 3 shows a side elevational view of the embodiment of FIG. 1.
Figure 4:
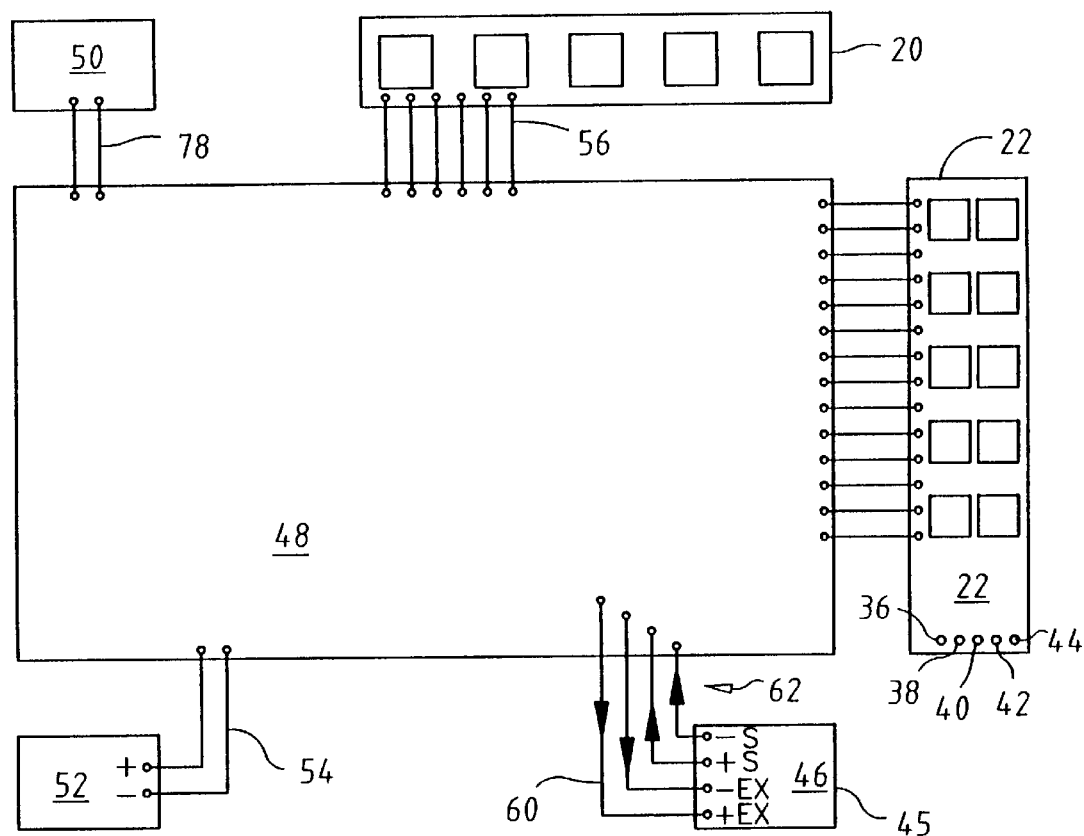
FIG. 4 shows a schematic of the circuitry of the embodiment of FIG. 1.
Figure 5:
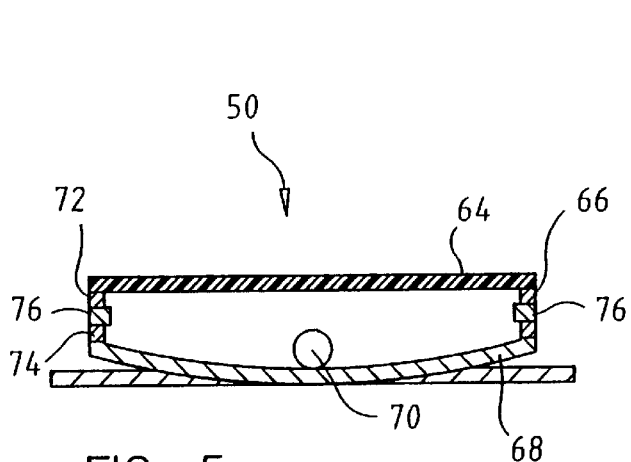
FIG. 5 shows a side sectional view of a level indicator of the invention.
Figure 6:
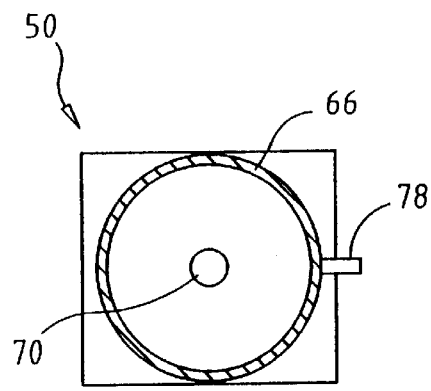
FIG. 6 shows a top sectional view of a level indicator of the invention.

The invention is now illustrated by reference to preferred embodiments thereof. Numeral 10 indicates the weigh scoop of the invention. Weigh scoop 10 has scoop 12 connected by load cell 45 incorporating strain gauge 46 to handle 16. Load cell is preferably covered by neck 14, attached to, or more preferably integral with handle 16. Handle 16 has broad end 18 for membrane keyboard 20, which has display panel 22 for display 24. Keyboard 20 has besides tactile switches 26 to 34, where switch 26 is ON/ZERO, switch 28 is OFF, switch 30 is ACCUMULATE, switch 32 is HOLD, switch 34 is UNITS, and indicator/annunciator lights 36 to 44, where light 36 indicates LEVEL, light 38 indicates METRIC (Kg/g) units, light 40 indicates AVOIRDUPOIS (or IMPERIAL) (Lb/Oz) light 42 indicates HOLD, light 44 indicates ZERO. The HOLD/ACCUMULATE switches can be combined into a single switch, either switch 30 or switch 32. The indicator/annunciator lights can also be in display panel 22. Strain gauge 46 of load cell 45 measures the weight in scoop 12 in analog form (stress/strain, deformation/displacement), which is converted by Analog/Digital converter in board 48 in handle 16 to digital signal for the CPU to process to digital readout on display 24. There is also level switch indicator 50 mounted either directly on load cell 45, or more preferably on neck 14, when present, and operatively associated with board 48, to ensure the scoop is held level to provide for the most accurate weighments. In the embodiment shown light 36 is on when level and off when not. 9V battery 52 provides power and excitation voltage to load cell, CPU, and display. Tactile switches, CPU, A/D converter, strain gauge load cell, and battery are all readily available conventional technology. The scoop can be made of any conventional materials that suit customer requirements, such as corrosive environment, or regulatory requirements, such as those imposed by departments of agriculture and health. Scoop 12 need not be the same material as handle 16 (and neck 14), as scoop 12 is generally more subject to regulatory requirement than handle 16. As noted above pvc, especially flex pvc is preferred, but conventional light metals, conventional plastics and wood, or even conventional ceramics can be used in scoop and handle. weighing capacity is envisaged between a minimum capacity of 10 oz (about 300 grams) and a maximum capacity of 160 oz (about 5 kilograms), with graduation steps of 1 to 10 oz, which is felt to be the most convenient range, although lesser and greater capacities, as well as different graduation steps, may be employed as those skilled in the art appreciate. This can be carried out routinely by programming the CPU converter with different parameters. In FIG. 4 is shown a schematic of the circuitry of the preferred embodiment. CPU and A/D converter are part of board 48, which is supplied with power by battery 52 through power lines 54, keyboard 20 is connected by data lines 56 to board 48, as is display panel 22 by data lines 58. Load cell 46 is connected to board 48 by paired excitation lines 60, while paired data lines 62 provide analog output to board 48. Level indicator 50 is shown in FIGS. 5 and 6, with transparent level top 64, circular sidewall 66 and conductive bottom wall 68, which forms a segment of a sphere. Inside level indicator 50 is metal ball bearing 70, as those skilled in the art appreciate any electrically conductive sphere will do. Bottom 68 subtends an angle of 8 to 12° at the center of the sphere of which it is part, to match the optimal maximum out-of-level condition (4 to 6°) so that when ball bearing 70 contacts sidewall 66 the scoop is from 4 to 6° from horizontal. Sidewall 66 has upper and lower insulating portions 72 and 74 separated by conductor 76. Conductor 76 is preferably circumferentially continuous and has conducting connector 78 to board 48. When level indicator 50 is tilted so ball bearing 70 contacts conductor 76 it closes a circuit between metal plate 68 and connector 78 supplying current to board 48. When this circuit is closed annunciator/ indicator light 36 goes out, and optionally display 22 is disabled so that there is no weight reading. Otherwise, when the circuit is open annunciator/indicator light 36 is on ann display 22 is enabled. The level indicator is mounted atop neck 14, so that the position of ball 70 is visible through transparent top 64, allowing the operator to maneuver the handle to center the ball within the indicator. Conductor 78 may be formed of one or more wires threaded through holes in sidewall 64, which are conveniently of copper. These wire or wires may be twisted around each other or braided to form connector 78. Ball bearing 70 is less in diameter than the height of sidewall 66 to allow free movement.

In use the ON/ZERO switch is actuated, to activate the device then the ON/ZERO switch is actuated to set the scale at zero. The LEVEL switch or indicator indicates whether the scoop is level (within 4° to 6° of horizontal) or not, which may be necessary for "legal for trade" applications and to achieve optimal weighing results. The scoop is then used to pick up material, the weight of which is indicated on the display. By actuating either the UNITS switch, the display will read in grams or ounces. The HOLD switch is used to indicate the previous weight, after the scoop is emptied, while the ACCUMULATE switch accumulates multiple weighments and provides a grand total of those weighments. HOLD and ACCUMULATE functions are conventional in the scale art. They also may be combined into a HOLD/ACCUMULATE switch, which on first actuation performs as HOLD and on second actuation behaves as ACCUMULATE. The OFF switch is used to switch the device off, an adjustable timer is built into the CPU board 48 to switch the device off after a predetermined time to lengthen battery life.

As those skilled in the art would realize these preferred described details and materials and components can be subjected to substantial variation, modification, change, alteration, and substitution without affecting or modifying the function of the described embodiments.

Although embodiments of the invention have been described above, it is not limited thereto, and it will be apparent to persons skilled in the art that numerous modifications and variations form part of the present invention insofar as they do not depart from the spirit, nature and scope of the claimed and described invention.

What is claimed is:

1. A scoop having an attached handle, and load cell means with strain gauge means, said load cell means being mounted in said handle and bearing said scoop, said strain gauge means being operatively associated with CPU means and said CPU means being operatively associated with readout display means, a level indicator operatively associated with said CPU means said level indicator actuating a level registering means, said level registering means registering level when said means is horizontal or at an angle to the horizontal less than or equal to a predetermined angle, and not registering level when said means is at an angle to the horizontal greater than said predetermined angle, whereby a weight in said scoop is converted to a display number on said readout display means.

2. Scoop of claim 1, wherein said scoop comprises PVC.

3. Scoop of claim 1 having a control switch assembly operatively associated with said CPU means and indicator/ annunciator lights operatively associated with said said CPU means.

4. Scoop of claim 3, wherein said control switch assembly comprises a plurality of switches, one switch each for ON/ZERO, OFF, ACCUMULATE, HOLD and UNITS said ON/ZERO switch actuating said CPU means on first actuation, and setting said display number to zero on second and subsequent actuations, said OFF switch deactivating said CPU means said ACCUMULATE switch actuating said readout display when a second or subsequent weight is placed in said scoop displaying the summed weights as a display number on said readout display said HOLD switch actuating said readout display to display the previous display number said UNITS switch changing the units of weight of said display number, from metric to avoirdupois, or from avoirdupois to metric.

5. Scoop of claim 3, wherein said indicator/annunciator lights comprise ZERO, HOLD, and UNITS lights said ZERO light being lit when the display number on said readout display is zero, but not otherwise, said HOLD light being lit when said readout display shows the previous display number, but not otherwise one of said UNIT lights being lit when the display number indicates metric units, but not otherwise the other of said UNIT lights being lit when the display number indicates avoirdupois units, but not otherwise.

6. Scoop of claim 3, wherein said level registering means is operatively associated said CPU means and an indicator/ annunciator light, said light being lit when said level registering means registers level, and being off otherwise.

7. Scoop of claim 3, wherein said level registering means is operatively associated said CPU means and said readout display means, said readout display means being enabled when said level registering means registers level, and being disabled otherwise.

8. A level indicator comprising a conducting base being part of a electric circuit, and forming a sector of a generally spherical surface, a sidewall circumvent said sector extending inward toward the center of said spherical surface, said sidewall having therein a circumferential conducting element spaced apart from and above said conducting base, said conducting element being part of said electric circuit and generally level when said indicator is level, a ball bearing resting and rollable on said conducting base, said ball bearing being in the middle of said conducting base when said base is level, and touching said conducting element in said sidewall when resting against said sidewall, whereby said electric circuit is closed, and a transparent insulating top wall above and touching said sidewall spaced apart from and opposed to said conducting base.

9. Level indicator of claim 8 wherein said electric circuit when open allows an indicator/annunciator light to light and when closed switches off said indicator/annunciator light.

10. Level indicator of claim 8 wherein said sector of said spherical surface subtends an angle of between about 8 and 12° at the center of said spherical surface, so that said indicator can tilt up to half said angle before said ball contacts said sidewall.

11. Level indicator of claim 8, wherein said electric circuit when open enables a visual weight display and when closed disables said visual weight display.

12. A scoop having an attached handle, said handle having associated therewith a level indicator of claim 9.

13. Scoop of claim 12, wherein said scoop comprises load cell means with strain gauge means, said load cell means being mounted in said handle and bearing said scoop, strain gauge being operatively associated with CPU means and said CPU means being operatively associated with readout display means, whereby a weight in said scoop is converted to a display number on said readout display means.

14. Scoop of claim 13 having a control switch assembly operatively associated with said CPU means and indicator/annunciator lights operatively associated with said CPU means.

15. Scoop of claim 14, wherein said control switch assembly comprises a plurality of switches, one switch each for ON/ZERO, OFF, ACCUMULATE, HOLD and UNITS said ON/ZERO switch actuating said CPU means on first actuation, and setting said display number to zero on second and subsequent actuations, said OFF switch deactivating said CPU means said ACCUMULATE switch actuating said readout display when a second or subsequent weight is placed in said scoop displaying the summed weights as a display number on said readout display said HOLD switch actuating said readout display to display the previous display number said UNITS switch changing the units of weight of said display number, from metric to avoirdupois, or from avoirdupois to metric.

16. Scoop of claim 14, wherein said indicator/annunciator lights comprise ZERO, HOLD, and UNITS lights said ZERO light being lit when the display number on said readout display is zero, but not otherwise, said HOLD light being lit when said readout display shows the previous display number, but not otherwise one of said UNIT lights being lit when the display number indicates metric units, but not otherwise the other of said UNIT lights being lit when the display number indicates avoirdupois units, but not otherwise.

17. Scoop of claim 14 having a level indicator operatively associated with said CPU means said level indicator actuating a level registering means, said level registering means registering level when said means is horizontal or at an angle to the horizontal less than or equal to a predetermined angle, and not registering level when said means is at an angle to the horizontal greater than said predetermined angle, an indicator/annunciator light operatively associated with said level registering means, said light being lit when said level registering means registers level, and being off otherwise.

18. Scoop of claim 14 having a level indicator operatively associated with said CPU means said level indicator actuating a level registering means, said level registering means registering level when said means is horizontal or at an angle to the horizontal less than or equal to a predetermined angle, and not registering level when said means is at an angle to the horizontal greater than said predetermined angle, said readout display means operatively associated with said level registering means, said readout display means being enabled when said level registering means registers level, and being disabled otherwise.

19. A scoop having an attached handle, and load cell means with strain gauge means, said load cell means being mounted in said handle and bearing said scoop, said strain gauge being operatively associated with CPU means and said CPU means being operatively associated with readout display means, whereby a weight in said scoop is converted to a display number on said readout display means.

20. Scoop of claim 19 having a control switch assembly operatively associated with said CPU means and indicator/annunciator lights operatively associated with said CPU means.

* * * * *